United States Patent
Glauning et al.

(10) Patent No.: US 8,113,868 B2
(45) Date of Patent: *Feb. 14, 2012

(54) ELECTRIC DEVICE, IN PARTICULAR ELECTRIC HANDHELD POWER TOOL

(75) Inventors: Rainer Glauning, Aichtal-Groetzingen (DE); Marcin Rejman, Waiblingen (DE); Wolf Matthias, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/980,466

(22) Filed: Dec. 29, 2010

(65) Prior Publication Data

US 2011/0092102 A1    Apr. 21, 2011

Related U.S. Application Data

(63) Continuation of application No. 11/412,687, filed on Apr. 27, 2006, now Pat. No. 7,883,355.

(30) Foreign Application Priority Data

May 2, 2005    (DE) .......................... 10 2005 020 358

(51) Int. Cl.
*H01R 11/20* (2006.01)
(52) U.S. Cl. ........................................ 439/435; 439/160
(58) Field of Classification Search ................... 439/435, 439/159–160, 700
See application file for complete search history.

(56) References Cited

U.S. PATENT DOCUMENTS

| | | | | |
|---|---|---|---|---|
| 5,334,076 A | * | 8/1994 | Shinozuka | 446/456 |
| 5,631,959 A | * | 5/1997 | Messin et al. | 379/428.01 |
| 5,961,356 A | * | 10/1999 | Fekete | 439/700 |
| 6,729,415 B1 | * | 5/2004 | Huang | 173/217 |
| 7,121,854 B2 | * | 10/2006 | Buck et al. | 439/160 |

* cited by examiner

*Primary Examiner* — Truc Nguyen
(74) *Attorney, Agent, or Firm* — Michael J. Striker

(57) ABSTRACT

An electric device has an electric unit having a receiving region, a power supply unit received by the receiving region of the electric unit in a receiving direction, contact units for making an electrical connection between the power supply unit and said electric unit, unit for counteracting a motion of the contact units, which is movable relative to the electric unit in the receiving direction, relative to the power supply unit located on the receiving region, and within a region intended for the motion.

35 Claims, 4 Drawing Sheets

ELECTRIC DEVICE, IN PARTICULAR ELECTRIC HANDHELD POWER TOOL

CROSS-REFERENCE TO A RELATED APPLICATION

This application is a continuation application of U.S. patent application Ser. No. 11/412,687, filed Apr. 27, 2006 now U.S. Pat. No. 7,883,355 ("the parent application"). The invention described in the parent application, and described and claimed herein below is also described in German patent application DE 10 2005 020 358.2, filed May 2, 2005. This German patent application, whose subject matter is incorporated by reference herein, provides the basis for a claim of priority of invention under 35 U.S.C. 119 (a)-(d).

BACKGROUND OF THE INVENTION

The invention is based on an electric device, in particular an electric handheld power tool.

From German Patent Disclosure DE 195 21 426 A1, a handheld power tool is known, with a receiving region on which a power supply unit for supplying an electric unit can be located. The handheld power tool is additionally provided with a contact means for making an electrical connection between the power supply unit and the electric unit, and this contact means is movable relative to the electric unit. To permit such a relative motion, clearance for the contact means is provided in the housing of the electric unit. By means of a guide means, the contact means is carried along with the power supply unit upon a motion of the power supply unit. As a result, abrasion and burnoff of contact elements of the contact means, which can be ascribed to vibration of the handheld power tool relative to the power supply unit, can be avoided.

SUMMARY OF THE INVENTION

The invention is based on an electric device, in particular an electric handheld power tool, including an electric unit having a receiving region for receiving a power supply unit, moved in a receiving direction to approach the receiving region, and including a contact means for making an electrical connection between the power supply unit and the electric unit.

It is proposed that the electric device has a means which is intended for counteracting a motion of the contact means, which is movable relative to the electric unit in the receiving direction, relative to the power supply unit located on the receiving region, and within a region intended for the motion. Particularly advantageously, wear of the contact means and/or of the power supply unit can be reduced. Moreover, unwanted burnoff of a contact element, such as a metal element, by way of which an electrical connection can be made between the power supply unit and the contact means, of the power supply unit and/or of the contact means can be reduced.

In this connection, the phrase "region intended for motion" is understood to mean in particular a region that offers clearance for a motion of the contact means and/or of the power supply unit located on the receiving region. The term "intended" should be understood in this context especially to mean "equipped" and/or "designed".

It is also proposed that the means is intended for guiding the contact means along with the power supply unit located on the receiving region. This is especially advantageous if the electric device is used for tasks in which it may be stressed by strong vibrations and/or shocks. A burnoff of contact elements of the power supply unit and/or of the contact means can be further reduced or prevented, which is especially advantageous, if in operation of the electric device a current with high current intensity can flow between the contact elements.

Carrying the contact means along with the power supply unit located on the receiving region can be attained especially simply by providing that the means is intended for pressing the contact means against the power supply unit located on the receiving region. By means of a force exerted on the power supply unit by the contact means, a further force, which has a tendency to put the power supply unit and the contact means out of contact with each other can be counteracted. This is especially advantageous for instance if the power supply unit has an ejection spring for ejecting the power supply unit that exerts a force on the contact means when a power supply unit is located on the receiving region.

It is also proposed that the means is intended for counteracting a motion of the contact means relative to the electric unit and when the power supply unit has been removed. As a result, unwanted wobbling of the contact means, for instance in the receiving region, can be reduced, which is especially advantageous when the electric device is being transported without a power supply unit.

Advantageously, the means is formed at least by a spring. By the use of a spring, a motion of the contact means can be counteracted in a way that is especially protective of the contact means. Motions of the contact means, especially motions that can arise from strong vibrations and/or shocks of the electric device, can in fact be cushioned, for instance by tensing and/or bending of the spring. Moreover, existing elements that are especially simple, inexpensive, and/or space-saving can be used.

In a further feature of the invention, it is proposed that the spring, in a tensed state, is in contact with at least two portions of the electric unit. As a result, the spring can be braced on the electric unit, and the torque of a contrary force exerted on the spring by the electric unit can be kept slight. In this bracing, a rotary motion of the spring can thus be reduced and in particular prevented. The torque can be kept slight especially effectively if the portions are spaced apart from one another. In order to attain a long spring travel in addition, each end of the spring can be in contact with a respective one of the portions. To attain especially high stability of the contact means when the spring is braced on the electric unit, the portions can be located on both sides of the contact means.

Advantageously, the portions each have a rounded surface. As a result, wear to the spring, which can arise from repeated sliding of the spring on a portion, for instance in repeated tensing and untensing motions of the spring, can be advantageously averted.

It is also proposed that the means is formed at least by a leaf spring. By the use of a leaf spring, a long spring length and a compact design of the means can be attained.

It is furthermore proposed that the spring is kept with initial stress on the contact means. Especially effective retention of the spring can be attained, and additional retaining means for retaining the spring can be avoided. Moreover, wobbling of the contact means when a power supply unit has been removed can advantageously be further reduced and in particular prevented, because as a result of the initial tension of the spring and bracing of the spring on the portions of the electric unit, the contact means is pressed against the electric unit.

In a further variant embodiment, the spring is embodied as an ejection spring for ejecting the power supply unit. Installation space for an additional ejection spring can advantageously be avoided, making an especially compact arrangement of a power supply unit located on the receiving region possible. The embodiment as an ejection spring can also be attained in a simple way by providing that a spring is made to fit an ejection function by means of the choice of initial tension, for instance, and/or of a material.

Especially simple installation and/or effective retention of the spring can furthermore be attained by providing that the means is kept on the contact means by form-locking engagement.

Further advantages will become apparent from the ensuing description of the drawings. In the drawings, exemplary embodiments of the invention are shown. The drawings, description and claims include numerous characteristics in combination. One skilled in the art will expediently consider the characteristics individually as well and put them together to make useful further combinations.

DESCRIPTION OF THE PREFERRED EMBODIMENTS

Figure 1A:
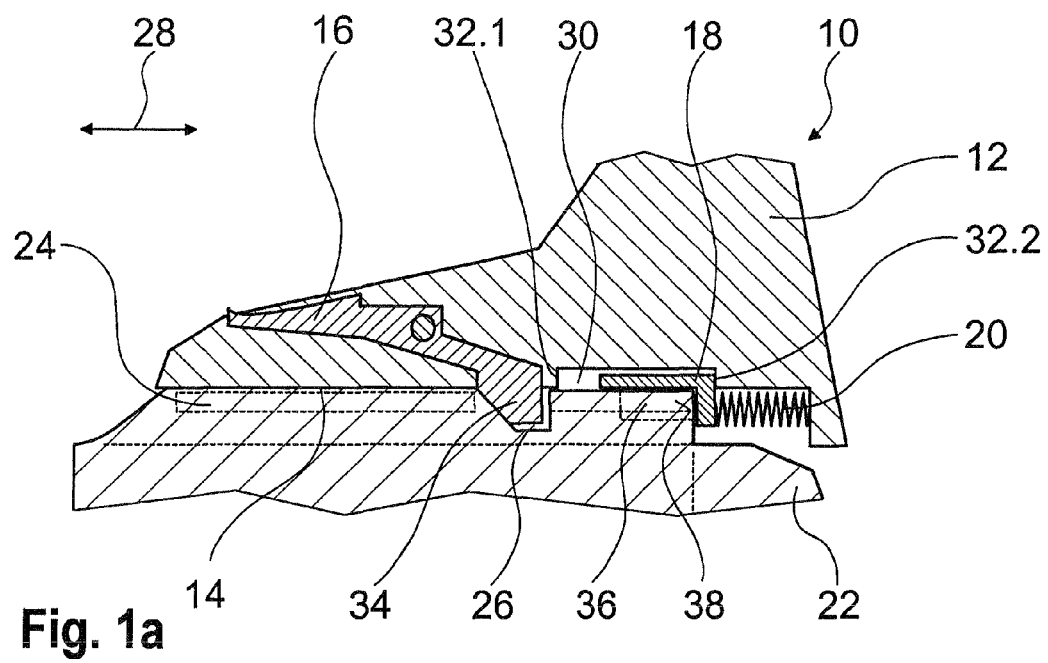
FIG. 1a is a section through an electric unit of a handheld power tool and through a power supply unit located on the electric unit.

In FIG. 1a, part of an electric device, embodied as a handheld power tool 10, is shown. Of the handheld power tool 10, in a sectional view, an electric unit 12, having a receiving region 14 and a lever 16; a contact means 18; and a means 20 embodied as a spring are shown. Located on the receiving region 14 is a power supply unit 22, embodied as a battery pack, which has a guide groove 24 and a recess 26. The contact means 18 is movable relative to the electric unit 12 in the receiving direction 28, specifically within a region 30 intended for motion, which is defined by housing walls 32.1, 32.2 of the electric unit 12. The contact means 18 also serves to make an electrical connection between the power supply unit 22 and the electric unit 12.

When the power supply unit 22 is made to approach the receiving region 14, a guide strip, not shown in the drawing, of the electric unit 12 is inserted into the guide groove 24 of the power supply unit 22. The power supply unit 22 is then thrust in the receiving direction 28, until a detent lug 34 of the lever 16 snaps into the recess 26 of the power supply unit 22. During the displacement of the power supply unit 22, metal contact blades 36 of the contact means 18 engage a gap, not identified by reference numeral in the drawing, of the power supply unit 22. During the displacement of the power supply unit 22, the contact means 18, which when the power supply unit 22 has been removed rests on the housing wall 32.1 of the electric unit 12, is struck by a side face 38 of the power supply unit 22 and is then displaced in the receiving direction 28, until the motion of the power supply unit 22 is stopped by the snapping of the detent lug 34 into place. Upon the displacement of the contact means 18, the means 20 embodied as a spring is tensed. In the process, the contact means 18 is pressed against the power supply unit 22 by a force exerted on the contact means 18 by the spring.

Figure 1B:
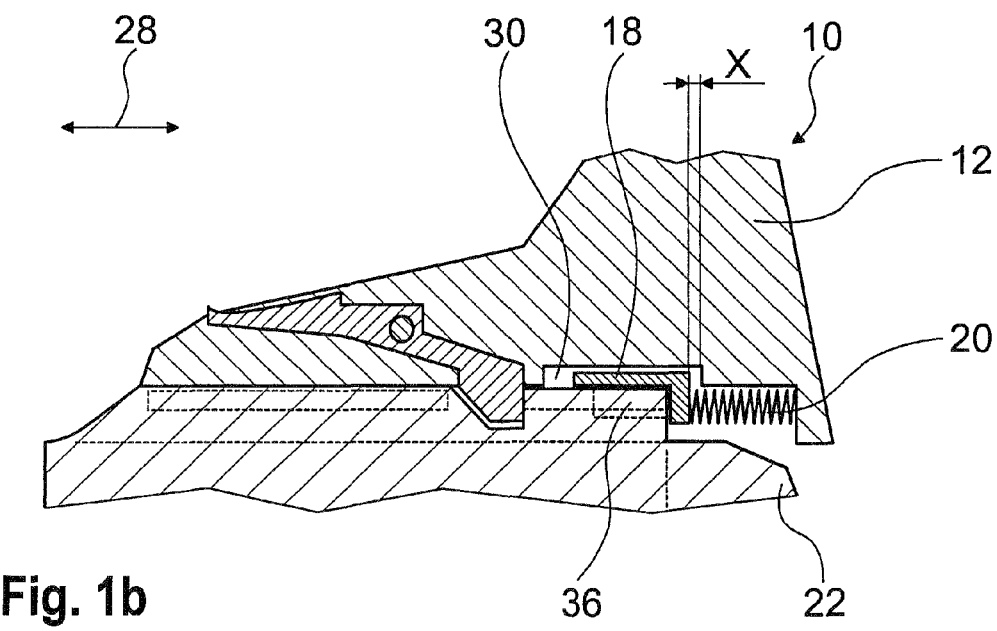
FIG. 1b shows the arrangement of FIG. 1a, with a power supply unit displaced by a travel distance.

In operation of the handheld power tool 10, an electrical connection is made between the power supply unit 22 and the handheld power tool 10, specifically via the metal contact blades 36 of the contact means 18, and an electrical connection, not shown in the drawing, between the contact means 18 and the electric unit 12 is also made. The power supply unit 22, which is movable in the receiving direction 28 relative to the electric unit 12, may, for instance because of vibrations and/or shocks that stress the handheld power tool 10, be displaced briefly by a travel distance x in the receiving direction 28. This displaced state can be seen in FIG. 1b. In this displacement, the contact means 18, which is pressed against the power supply unit 22 by the spring force, is carried along with the power supply unit 22. A motion of the contact means 18 in the region 30 relative to the power supply unit 22 can therefore be prevented by the means 20, and as a result abrasion and/or burnoff of the metal contact blades 36 can be reduced.

Figure 2:
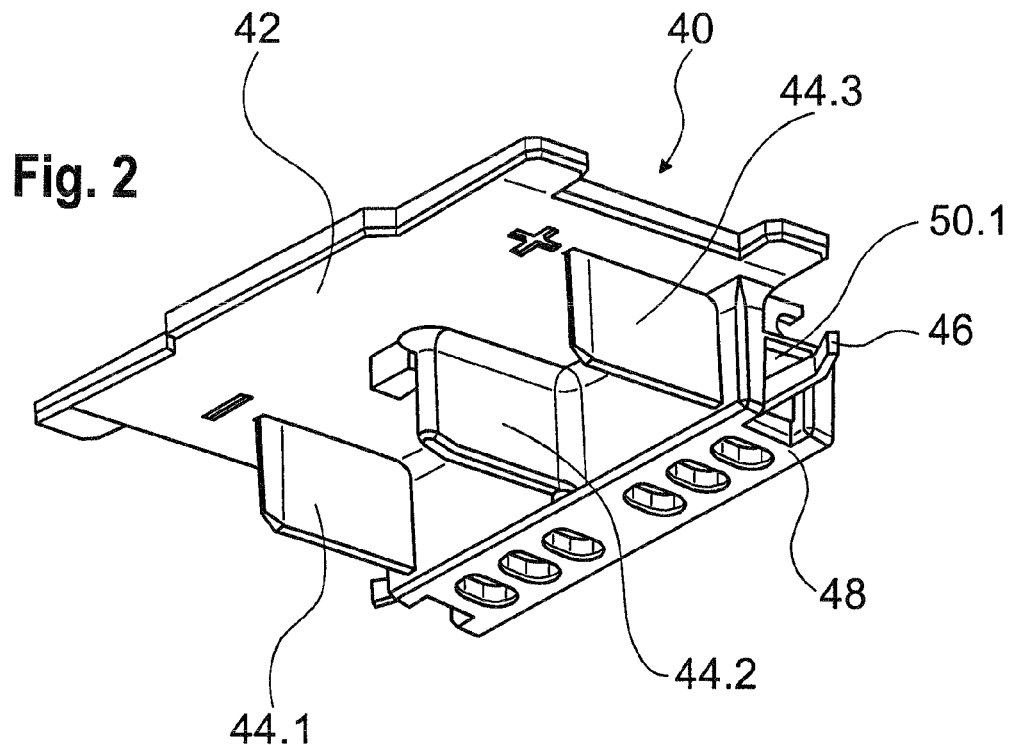
FIG. 2 shows a contact means, embodied as a contact plate, with a leaf spring, in perspective.
Figure 3:
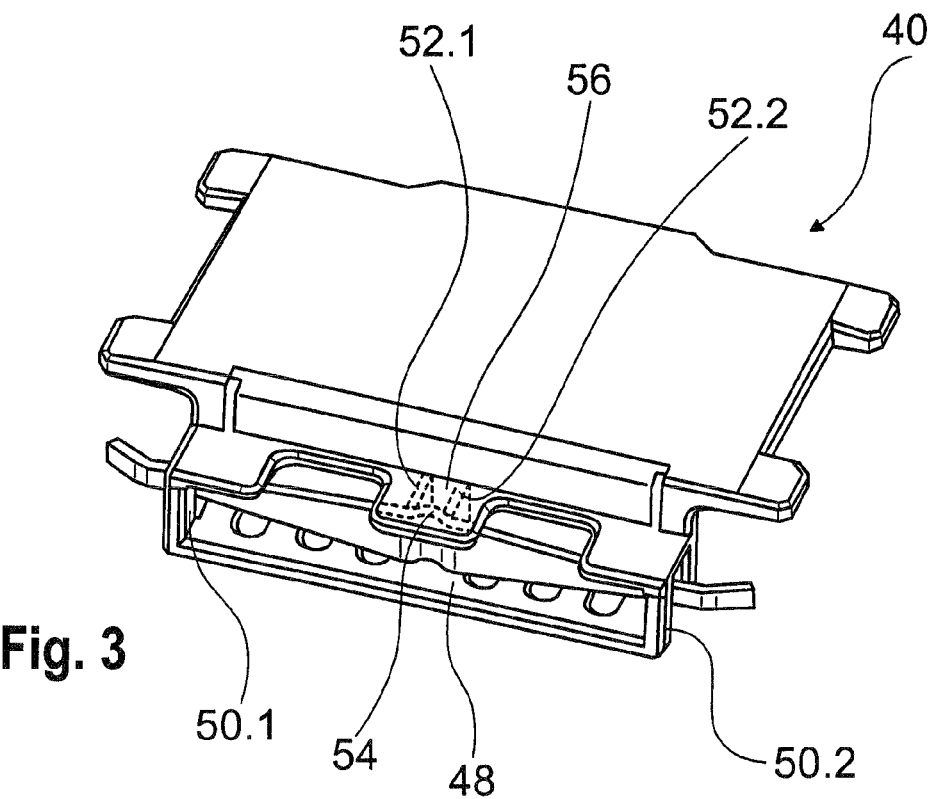
FIG. 3 shows the contact plate of FIG. 2 in a further view.

FIGS. 2 and 3 show a contact means 40 in a further exemplary embodiment. It includes a plastic body 42, in which three metal contact blades 44.1, 44.2, 44.3 are embedded, and also includes a means 46, embodied as a leaf spring, that is retained in a receiving part 48 of the plastic body 42. This receiving part 48 has two openings 50.1, 50.2 and two ribs 52.1, 52.2. Upon installation of the leaf spring, this spring is introduced into the receiving part 48 through one of the openings 50.1, 50.2, until a detent lug 54 of the leaf spring snaps into a gap 56, formed by the ribs 52.1, 52.2. After snapping into place, the means 46 embodied as a leaf spring is retained by form-locking engagement in the longitudinal direction of the receiving part 48.

Figure 4A:
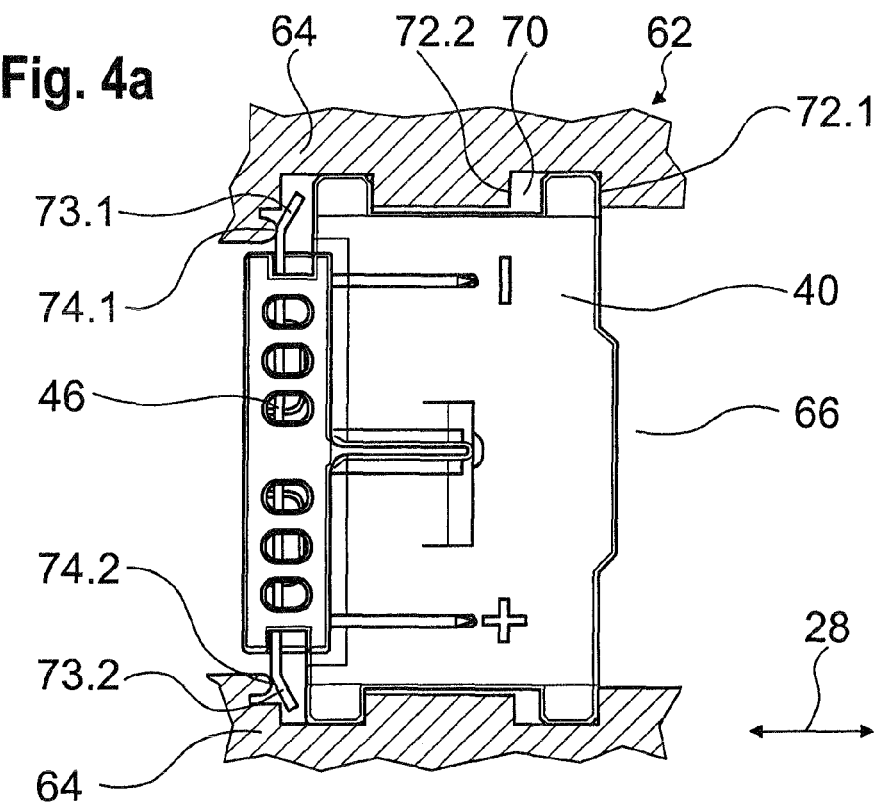
FIG. 4a shows an electric unit of a further handheld power tool, having the contact plate of FIG. 2.
Figure 4B:
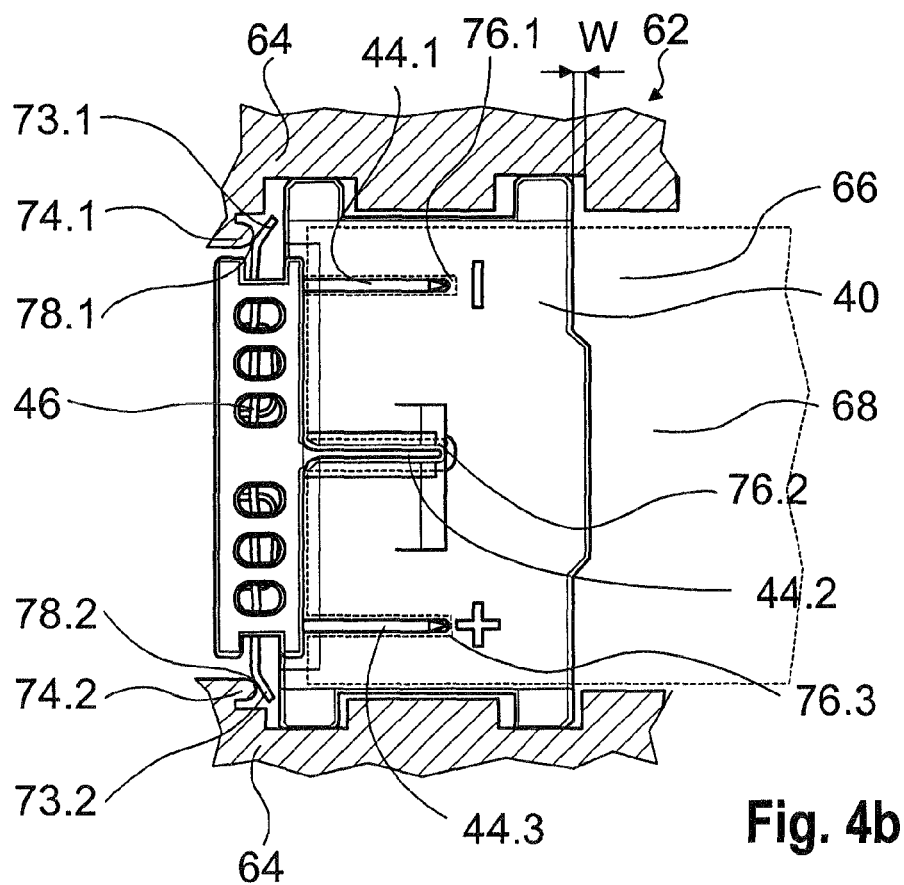
FIG. 4b shows the arrangement of FIG. 4a with a power supply unit attached.
Figure 4C:
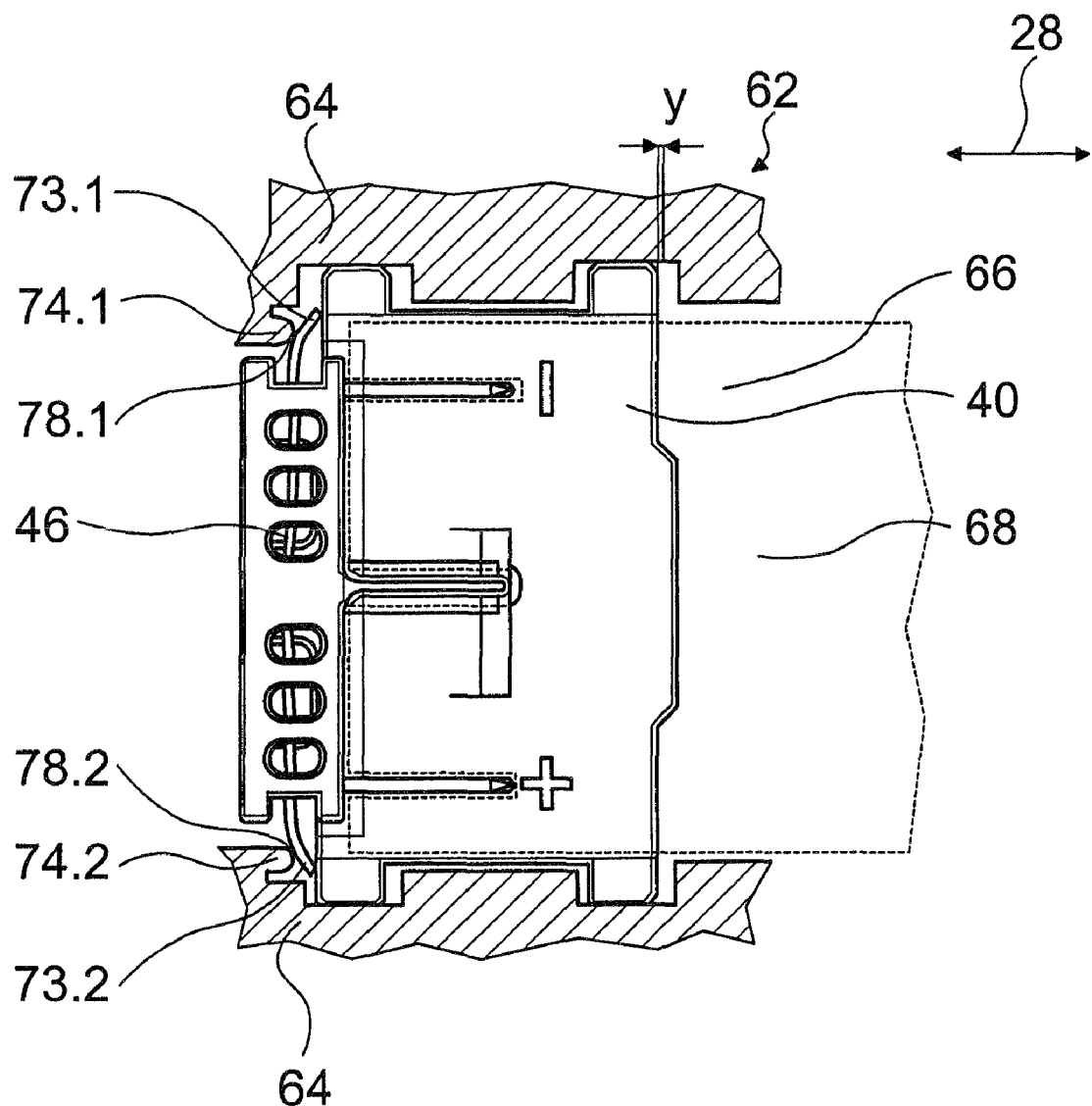
FIG. 4c shows the arrangement of FIG. 4b, with a power supply unit displaced by a travel distance.

In FIGS. 4a, 4b and 4c, the contact means 40 is built into a further electric device, embodied as a handheld power tool 62. The handheld power tool 62 includes an electric unit 64 with a receiving region 66 for receiving a power supply unit 68, which is shown in FIGS. 4b and 4c. The contact means 40 is movable in the receiving direction 28 relative to the electric unit 64 within a region 70 intended for motion, the region 70 being defined by housing walls 72.1 and 72.2.

In FIG. 4a, the handheld power tool 62 is shown with the power supply unit 68 removed. Ends 73.1, 73.2 of the leaf spring are braced on respective portions 74.1, 74.2 of the electric unit 64, and as a result the leaf spring is kept under initial tension, which prevents rattling of the leaf spring. As a result, a slight pressure is furthermore exerted by the contact means 40 on the housing wall 72.1 of the electric unit 64, which when the electric device is being transported with the power supply unit 68 removed reduces wobbling of the contact means 40 relative to the electric unit 64.

When the power supply unit 68, embodied as a battery pack, is brought toward the receiving region, the contact means 40 is displaced by the power supply unit 68 by a travel distance W, until the motion of the power supply unit 68 is stopped by a detent device, formed for instance by the lever 16 and the recess 26 of FIG. 1a. Upon this displacement of the contact means 40, the leaf spring is accordingly tensed further, by means of a force exerted on the detent lug 54 by the ribs 52.1, 52.2. This state of the handheld power tool 62, with the power supply unit 68 in place, is shown in FIG. 4b. In this state, the contact means 40 is pressed against the power supply unit 68 by the bracing of the tensed leaf spring on the portions 74.1, 74.2. Moreover, the metal contact blades 44.1, 44.2, 44.3 of the contact means 40 engage gaps 76.1, 76.2, 76.3 of the power supply unit 68.

The power supply unit 68, which is movable in the receiving direction 28, may be offset relative to the electric unit 64 by a travel distance y, for instance because of vibrations and/or shocks of the electric device. This displaced state of the power supply unit 68 is shown in FIG. 4c. In the displacement, the contact means 40 is carried along with the power supply unit 68, since the contact means 40 is pressed against the power supply unit 68 by the spring force, and the leaf spring becomes tensed further. In the process, the ends 73.1, 73.2 are displaced on the respective portions 74.1, 74.2. To reduce abrasion of the ends 73.1, 73.2 of the leaf spring from repeated tensing and untensing motions of the leaf spring, the portions 74.1, 74.2 are each provided with a respective rounded surface 78.1 and 78.2.

The leaf spring can additionally be used as an ejection spring. The force in FIG. 4b exerted on the power supply unit 68 by the contact means 40 can be utilized, upon release of a detent connection, to eject the power supply unit 68. In the process, the power supply unit 68 can be displaced by the travel distance W by the contact means 40.

It will be understood that each of the elements described above, or two or more together, may also find a useful application in other types of constructions differing from the types described above.

While the invention has been illustrated and described as embodied in an electrical device, in particular electric hand-held power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hand-held power tool, comprising:
   an electric unit having a receiving region;
   a battery pack received by said receiving region of said electric unit in a receiving direction; and
   contact means for making an electrical connection between said battery pack and said electric unit;
   wherein said contact means is movable relative to said electric unit in said receiving direction; and
   wherein said contact means is pressed against said battery pack by a force exerted on said contact means by a spring.

2. A hand-held power tool as defined in claim 1, wherein said spring is configured for guiding said contact means along with said battery pack located on said receiving region.

3. A hand-held power tool as defined in claim 1, wherein said spring is configured for counteracting a force which tends to put said battery pack and said contact means out of contact with each other.

4. A hand-held power tool as defined in claim 1, wherein said spring is arranged to be braced on said electric unit.

5. A hand-held power tool as defined in claim 1, wherein said spring is configured as an ejection spring for ejecting said battery pack.

6. A hand-held power tool as defined in claim 1, wherein said spring is configured to be maintained on said contact means by form-locking engagement.

7. A hand-held power tool as defined in claim 1, wherein said spring is configured as a spiral spring.

8. A hand-held power tool as defined in claim 1, wherein said spring is configured as a leaf spring.

9. A hand-held power tool as defined in claim 1, wherein said spring, in a tensed state, is in contact with at least two portions of said electric unit.

10. A hand-held power tool as defined in claim 9, wherein said portions of said electric unit each have rounded surfaces.

11. A hand-held power tool as defined in claim 8, wherein said spring is configured so that it is kept with initial stress on said contact means.

12. A hand-held power tool, comprising:
    an electric unit having a receiving region;
    a battery pack received by said receiving region of said electric unit in a receiving direction;
    contact means for making an electrical connection between said battery pack and said electric unit, wherein said contact means is movable relative to said electric unit in said receiving direction; and
    a spring which is configured for counteracting a motion of said contact means relative to said battery pack.

13. A hand-held power tool as defined in claim 12, wherein said contact means is pressed against said battery pack by a force exerted on said contact means by said spring.

14. A hand-held power tool as defined in claim 12, wherein said spring is configured for guiding said contact means along with said battery pack located on said receiving region.

15. A hand-held power tool as defined in claim 12, wherein said spring is configured for counteracting a force which tends to put said battery pack and said contact means out of contact with each other.

16. A hand-held power tool as defined in claim 12, wherein said spring is arranged to be braced on said electric unit.

17. A hand-held power tool as defined in claim 12, wherein said spring is configured as an ejection spring for ejecting said battery pack.

18. A hand-held power tool as defined in claim 12, wherein said spring is configured to be maintained on said contact means by form-locking engagement.

19. A hand-held power tool as defined in claim 12, wherein said spring is configured as a spiral spring.

20. A hand-held power tool as defined in claim 12, wherein said spring is configured as a leaf spring.

21. A hand-held power tool as defined in claim 12, wherein said spring, in a tensed state, is in contact with at least two portions of said electric unit.

22. A hand-held power tool as defined in claim 21, wherein said portions of said electric unit each have rounded surfaces.

23. A hand-held power tool as defined in claim 20, wherein said spring is configured so that it is kept with initial stress on said contact means.

24. A hand-held power tool, comprising:
    an electric unit having a receiving region;
    a battery pack received by said receiving region of said electric unit in a receiving direction;
    contact means for making an electrical connection between said electric unit and said battery pack; and
    a spring arranged between said electric unit and said contact means in said receiving direction;
    wherein said contact means is movable relative to said electric unit in said receiving direction within a region intended for motion.

25. A hand-held power tool as defined in claim 24, wherein said contact means is presses against said battery pack located by a force exerted on said contact means by said spring.

26. A hand-held power tool as defined in claim 24, wherein said spring is configured for guiding said contact means along with said battery pack within said receiving region.

27. A hand-held power tool as defined in claim 24, wherein said wherein said spring is configured for counteracting a force which urges said battery pack and said contact means out of contact with each other.

28. A hand-held power tool as defined in claim 24, wherein said spring is arranged to be braced on said electric unit.

29. A hand-held power tool as defined in claim 24, wherein said spring is configured as an ejection spring for ejecting said battery pack.

30. A hand-held power tool as defined in claim 24, wherein said spring is configured to be maintained on said contact means in a form-locking arrangement.

31. A hand-held power tool as defined in claim 24, wherein said spring is configured as a spiral spring.

32. A hand-held power tool as defined in claim 31, wherein said spiral spring is configured so that it is maintained with initial stress on said contact means.

33. A hand-held power tool as defined in claim 24, wherein said spring is configured as a leaf spring.

34. A hand-held power tool as defined in claim 24, wherein said spring, in a tensed state, is in contact with at least two portions of said electric unit.

35. A hand-held power tool as defined in claim 34, wherein said at least two portions of said electric unit include rounded surfaces.

* * * * *